(12) United States Patent
Bahout

(10) Patent No.: US 10,135,625 B2
(45) Date of Patent: Nov. 20, 2018

(54) METHOD OF COMMUNICATION OVER A TWO-WIRE BUS

(71) Applicant: STMicroelectronics (Rousset) SAS, Rousset (FR)

(72) Inventor: Yvon Bahout, Fuveau (FR)

(73) Assignee: STMICROELECTRONICS (ROUSSET) SAS, Rousset (FR)

(*) Notice: Subject to any disclaimer, the term of this patent is extended or adjusted under 35 U.S.C. 154(b) by 113 days.

(21) Appl. No.: 14/984,073

(22) Filed: Dec. 30, 2015

(65) Prior Publication Data

US 2016/0344563 A1    Nov. 24, 2016

(30) Foreign Application Priority Data

May 19, 2015    (FR) ...................... 15 54460

(51) Int. Cl.
  *H02J 1/00*    (2006.01)
  *H04L 12/10*   (2006.01)
  *G06F 13/42*   (2006.01)

(52) U.S. Cl.
  CPC .......... *H04L 12/10* (2013.01); *G06F 13/4291* (2013.01)

(58) Field of Classification Search
  CPC ............. G06F 13/364; G06F 13/4282; G06F 9/30007; G06F 9/30014; G06F 9/30032; G06F 13/4291; G06F 13/4295
  See application file for complete search history.

(56) References Cited

U.S. PATENT DOCUMENTS

| 5,398,326 | A  | 3/1995 | Lee |
| 7,521,963 | B1 | 4/2009 | Xin-LeBlanc |
| 8,812,760 | B1* | 8/2014 | Bamford ............... G06F 5/065 710/110 |
| 2004/0041594 | A1* | 3/2004 | Kang .................. H03K 3/012 326/121 |
| 2010/0017553 | A1* | 1/2010 | Laurencin .......... G06F 13/4027 710/307 |
| 2015/0100862 | A1* | 4/2015 | Sengoku ............ H03M 13/096 714/807 |

FOREIGN PATENT DOCUMENTS

| CN | 1534500 A | 10/2004 |
| CN | 1694425 A | 11/2005 |
| CN | 101785313 A | 7/2010 |

OTHER PUBLICATIONS

French Search Report, dated Mar. 10, 2016, for French Application No. 1554460, 8 pages.
"The I²C-Bus Specification," Philips Semiconductors, version 2.1, Jan. 2000, 46 pages.

* cited by examiner

*Primary Examiner* — Sibin Chen
(74) *Attorney, Agent, or Firm* — Seed IP Law Group LLP

(57) ABSTRACT

A method of communication between a first circuit and a second circuit coupled together over a two-line bus having a clock line and a data line. A power signal is provided to the second circuit over the two-line bus by setting the clock line and the data line to different potential levels. A bit is transmitted from one of the first circuit and the second circuit to the other of the first circuit and the second circuit by setting the data line to a potential level according to a state of the bit to be transmitted when the clock line is set at a first potential level. A bit is read in response to a transition of the clock line from the first potential level to a second potential level, different from the first potential level.

22 Claims, 3 Drawing Sheets

METHOD OF COMMUNICATION OVER A TWO-WIRE BUS

BACKGROUND

Technical Field

The present disclosure relates to data transmissions between a master circuit and a slave circuit connected on a two-wire bus.

Description of the Related Art

A two-wire bus comprises a conductor conveying a data signal and a conductor conveying a clock or synchronization signal. In a two-wire bus, the conductor conveying the data signal is generally, in the quiescent state, at a potential different from ground, generally at a positive potential such as the power supply potential. The data are transmitted by pulling the conductor conveying the data signal to ground according to a coding enabling the data receiver to decode the data. Many communication protocols using a two-wire bus, for example, I2C-type protocols, are known.

In usual systems, the different circuits connected on the two-wire bus are generally powered by one or a plurality of conductors different from those of the two-wire bus, and have a reference potential for example, the ground, common to all circuits.

BRIEF SUMMARY

An embodiment facilitates providing a communication method using a two-wire bus which is adapted to a system where the slave circuit shares no common potential such as the ground with the master circuit.

In an embodiment, a method of communication, over a two-wire bus, between a first circuit providing a first digital signal and a second circuit, comprising transmitting a bit from a transmit circuit from among the first circuit and the second circuit to the other circuit, wherein the transmit circuit sets a second digital signal according to the state of the bit to be transmitted while the first signal is at a first level.

According to an embodiment, the bit is read on a transition of the first signal.

According to an embodiment, the method further comprises a step of waking up the second circuit during which the first circuit causes a transition of a first type of the second signal while the first signal is at a second level different from the first level.

According to an embodiment, the method further comprises a step of setting the second circuit to stand-by during which the first circuit causes a transition of a second type of the second signal while the first signal is at the second level.

According to an embodiment, the transition of the first type is a falling edge and the transition of the second type is a rising edge.

According to an embodiment, on transmission of a bit from the first circuit to the second circuit, while the first signal is at the first level and before setting the second signal according to the state of the bit to be transmitted, the first circuit sets the second signal to a level different from the first level.

In an embodiment, a system comprises a first circuit and at least a second circuit capable of implementing the above-mentioned communication method.

According to an embodiment, the first circuit is powered with a voltage referenced to a first potential and comprises a first switch for coupling, to the first potential a conductor of the bus conveying the second signal; the second circuit is coupled to a high potential and to a low potential, and comprises a second switch for coupling said conductor to the low potential; and a resistive element couples said conductor to a second potential of said voltage.

According to an embodiment, the high potential and the low potential are extracted from the bus.

In an embodiment, a method comprises: coupling a first circuit and a second circuit together over a two-line bus having a clock line and a data line; selectively providing a power signal to the second circuit over the two-line bus by setting the clock line and the data line to different potential levels; and transmitting a bit from one of the first circuit and the second circuit to the other of the first circuit and the second circuit, the transmitting including: setting, by the one of the first and second circuits, the data line to a potential level according to a state of the bit to be transmitted when the clock line is set at a first potential level; and reading, by the other of the first and second circuits, the data line in response to a transition of the clock line from the first potential level to a second potential level, different from the first potential level. In an embodiment, the first circuit is a master circuit and the second circuit is a slave circuit. In an embodiment, the method comprises: waking up the second circuit, the waking up including the first circuit causing a transition of a first type of the data line when the clock line is at the second potential level. In an embodiment, the method comprises: setting the second circuit to a stand-by mode, the setting the second circuit to the stand-by mode including the first circuit causing a transition of a second type of the data line when the clock line is at the second potential level. In an embodiment, the transition of the first type is a falling edge transition and the transition of the second type is a rising edge transition. In an embodiment, the selectively providing a power signal comprises, during a transmission of a bit from the first circuit to the second circuit, when the clock line is at the first potential level, and before setting the data line according to the state of the bit to be transmitted, the first circuit sets the data line to a potential level different from the first potential level.

In an embodiment, a system comprises: a first circuit; a second circuit; and a two-line bus coupling the first circuit to the second circuit, the two-line bus including a clock line and a data line, wherein in operation, the first circuit selectively provides a power signal to the second circuit over the two-line bus by setting the clock line and the data line to different potential levels; one of the first circuit and the second circuit selectively transmits a bit to the other of the first circuit and the second circuit by setting the data line to a potential level according to a state of the bit to be transmitted when the clock line is set at a first potential level; and the other of the first and second circuits, in response to a transition of the clock line from the first potential level to a second potential level, different from the first potential level, reads the data line. In an embodiment, the first circuit is a master circuit and the second circuit is a slave circuit. In an embodiment, in operation, the master circuit selectively wakes up the slave circuit by causing a transition of a first type of the data line when the clock line is at the second potential level. In an embodiment, the master circuit selectively sets the slave circuit to a stand-by mode by causing a transition of a second type of the data line when the clock line is at the second potential level. In an embodiment, the transition of the first type is a falling edge transition and the transition of the second type is a rising edge transition. In an embodiment, the selectively providing a power signal comprises, during a transmission of a bit from the first circuit to the second circuit, when the clock line is at the first potential level, and before setting the data line according to the state of the bit to be transmitted, the first circuit sets the data line to a potential level different from the first potential level. In an embodiment, the first circuit is powered with a voltage referenced to the first potential and comprises a first switch to couple the first potential to the data line of the bus; the second circuit has a high potential node and to a low potential node, and comprises a second switch to couple the data line to the low potential node; and a resistive element coupled between said data line and the second potential level. In an embodiment, the second circuit comprises a rectification circuit coupled between the two-line bus and the high and low potential nodes, and the rectification circuit, in operation, extracts power from the two-line bus. In an embodiment, the two-line bus is a first two-line bus and the system comprises: a second slave circuit; and a second two-line bus having a clock line and a data line and coupling the master circuit to the second slave circuit. In an embodiment, the first two-line bus and the second two-line bus share at least one of a common clock line and a common data line.

In an embodiment, a master circuit comprises: a first potential node; a second potential node; a first bus node, which, in operation, outputs a clock signal to a clock line of a two-line bus; a second bus node, which, in operation, couples to a data line of the two-line bus; and control circuitry, which, in operation: selectively provides a power signal to the first bus node and the second bus node by setting the clock signal and a data signal to different potential levels; transmits a bit by setting the data signal to a potential level according to a state of the bit to be transmitted when the clock signal is set at a first potential level; and reads a bit by reading the second bus node in response to a transition of the clock signal from the first potential level to a second potential level, different from the first potential level. In an embodiment, the control circuitry, in operation, selectively transmits a wake-up signal to a slave circuit by causing a transition of a first type of the data signal when the clock signal is at the second potential level. In an embodiment, the control circuitry, in operation, selectively transmits a stand-by signal to the slave circuit by causing a transition of a second type of the data signal when the clock signal is at the second potential level. In an embodiment, the selectively providing a power signal comprises, during a transmission of a bit when the clock signal is at the first potential level, and before setting the data signal according to the state of the bit to be transmitted, setting the data signal to a potential level different from the first potential level. In an embodiment, the master circuit comprises: a resistive element coupled between the first potential node and the second bus node; and a switch coupled between the second bus node and the second potential node, wherein in operation, the control circuitry generates the data signal by controlling the switch.

In an embodiment, a slave circuit comprises: a first bus node, which, in operation, couples to a clock line of a two-line bus; a second bus node, which, in operation, couples to a data line of the two-line bus; and control circuitry, which, in operation: extracts a power signal from the first bus node and the second bus node when a received clock signal at the first bus node and a received data signal at the second bus node at different potential levels; transmits a bit by setting the data signal at the second bus node to a potential level according to a state of the bit to be transmitted when the received clock signal is set at a first potential level; and reads a bit by reading the second bus node in response to a transition of the received clock signal from the first potential level to a second potential level, different from the first potential level. In an embodiment, the control circuitry, in operation, causes the slave circuit to enter a wake-up mode in response to a transition of a first type of a received data signal when the clock signal is at the second potential level. In an embodiment, the control circuitry, in operation, causes the slave circuit to enter a stand-by mode in responds to a transition of a second type of the received data signal when the clock signal is at the second potential level. In an embodiment, the slave circuit comprises: rectification circuitry coupled to the first bus node and the second bus node, wherein the rectification circuitry, in operation, extracts the power signal and provides the power signal to a high-potential node and a low-potential node; a capacitance coupled between the high-potential node and the low-potential node; and a switch coupled between the second bus node and the low-potential node.

DETAILED DESCRIPTION

Figure 1:
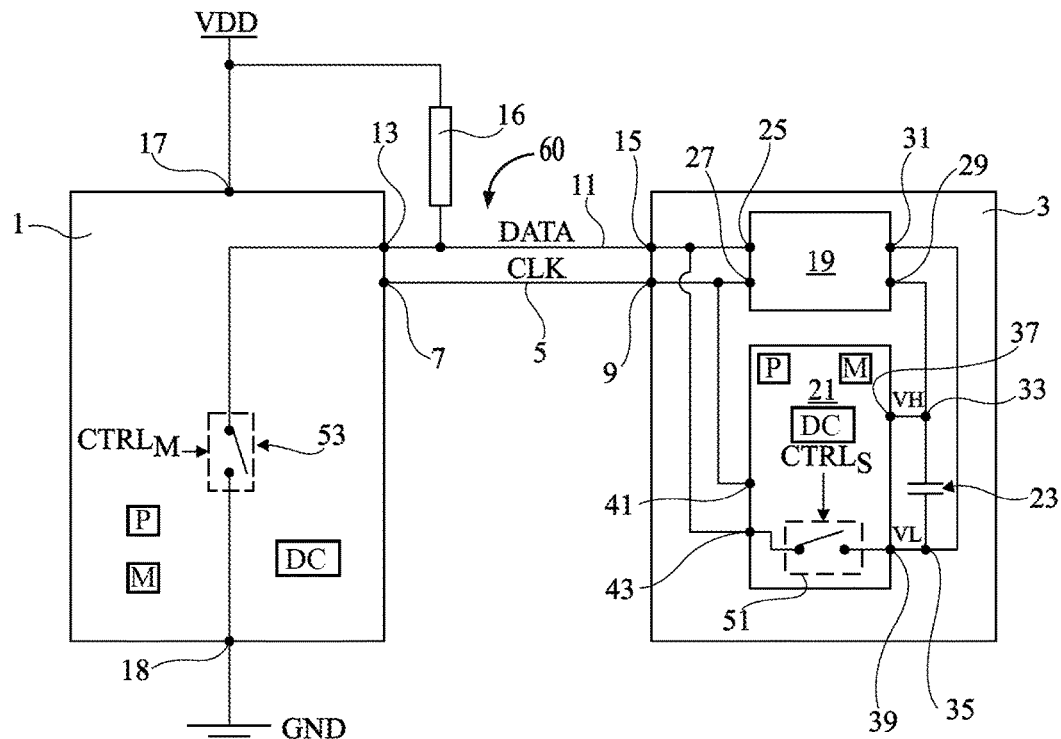
FIG. 1 is a partial block diagram of an embodiment of a system comprising a master circuit and a slave circuit on a two-wire bus.

In the ensuing description, numerous specific details are provided in order to facilitate as much as possible understanding of the embodiments provided by way of example. The embodiments may be implemented with or without specific details, or else with other methods, components, materials, etc. In other cases, structures, materials, or operations that are well known are not shown or described in detail so that aspects of the embodiments will not be obscured. Reference in the framework of the present description to "an embodiment" or "one embodiment" means that a given peculiarity, structure, or characteristic described in connection with the embodiment is comprised in at least one embodiment. Hence, recurrence of phrases such as "in an embodiment" or "in one embodiment" in various points of the present description does not necessarily refer to one and the same embodiment. Moreover, the peculiarities, structures, or characteristics may be combined in any convenient way in one or more embodiments.

The notations and references are here provided only for convenience of the reader and do not define the scope or the meaning of the embodiments.

The same elements have been designated with the same reference numerals in the different drawings unless the context indicates otherwise and, further, the various drawings are not to scale. For clarity, only those elements which are useful to the understanding of the described embodiments have been shown and are detailed.

FIG. 1 is a partial block diagram of an embodiment of a system comprising a master circuit and a slave circuit on a two-wire bus.

A master circuit 1 and a slave circuit 3 are connected by a two-wire bus 60. The two-wire bus 60 comprises a conductor 5 conveying a digital synchronization signal CLK between a terminal 7 of circuit 1 and a terminal 9 of circuit 3. Signal CLK, provided by master circuit 1, is periodic or not and may have any duty cycle and frequency. The bus 60 further comprises a conductor 11 conveying a digital data signal DATA between a terminal 13 of circuit 1 and a terminal 15 of circuit 3. The bus may be bidirectional. A resistive element 16 couples conductor 11 to a high positive potential, in this example, power supply potential VDD of master circuit 1. Master circuit 1 comprises a terminal 17 coupled to power supply potential VDD, and a terminal 18 coupled to a reference potential GND.

Slave circuit 3 comprises a voltage rectification bridge 19, a circuit 21 to read from and possibly writing on the bus 60, and a capacitance 23. Rectifying bridge 19 comprises two input terminals 25 and 27 respectively coupled to terminals 15 and 9 of slave circuit 3, and two output terminals 29 and 31 respectively coupled to electrodes 33 and 35 of capacitance 23. Circuit 21 comprises two terminals 37 and 39 respectively coupled to electrodes 33 and 35 of capacitance 23, and two terminals 41 and 43 respectively coupled to terminals 9 and 15 of circuit 3.

When signals CLK and DATA are at opposite levels, rectifying bridge 19 delivers a non-zero positive voltage between its output terminals 31 and 29 to charge capacitance 23. As a result, a high potential VH is available on terminal 37 of circuit 21, and a low potential VL is available on terminal 39 of circuit 21, which enables to power slave circuit 3, if the latter has no battery-type or other power source.

Further, circuit 21 of slave circuit 3 comprises a switch 51, and master circuit 1 comprises a switch 53. Switch 51, controlled by a signal $CTRL_S$ of circuit 21, couples terminal 43 to terminal 39, and circuit 1 has a switch 53, controlled by a signal $CTRL_M$ of circuit 1, which couples terminal 13 to terminal 18. Switches 51 and 53 are for example made in the form of MOS transistors.

In the quiescent state, switches 51 and 53 are off and conductor 11 is pulled to power supply potential VDD by resistive element 16. Signal DATA then is at a high level substantially equal to potential VDD if the voltage drop in resistive element 16 is neglected. On transmission of a bit, at different times which depend on the implemented communication protocol, conductor 11 is pulled to reference potential GND when switch 53 is on, or to low potential VL of terminal 39 when switch 51 is on and switch 53 is off. Signal DATA then is at a low level, designated as GND/VL in the rest of the description.

In such a system, when signals CLK and DATA are at the same level, high or low, the rectifying bridge delivers no voltage. Rectifying bridge 19 thus only supplies power to circuit 21 when signals CLK and DATA are at opposite levels.

According to an embodiment, the storage or reading of a bit of signal DATA by the receive circuit is provided to occur on a rising edge of signal CLK, the bit being at state '1' if signal DATA is at the high level, and at state '0' if signal DATA is at the low level.

Further, when reference is made to switchings of signal DATA at the times of the edges of signal CLK, in practice the level switchings of signal DATA occur at times slightly subsequent to these edges. For example, such level switchings of signal DATA occur after the edges of signal CLK with a delay in the range from 1 to 10% of the duration of the levels of signal CLK.

As illustrated, the first circuit 1 and second circuit 2 each comprises control circuitry, which includes processing circuitry P, one or more memories M and discrete circuitry DC. The processing circuitry P, the one or more memories M and the discrete circuitry DC of the control circuitry may perform, alone or in various combinations, one or more functions of the first and second circuits, such as generating the control signals $CTRL_M$ and $CTRL_S$, generating a clock signal, generating a data signal, generating data to be transmitted, processing received clock signals, processing received data signals, etc.

Figure 2:
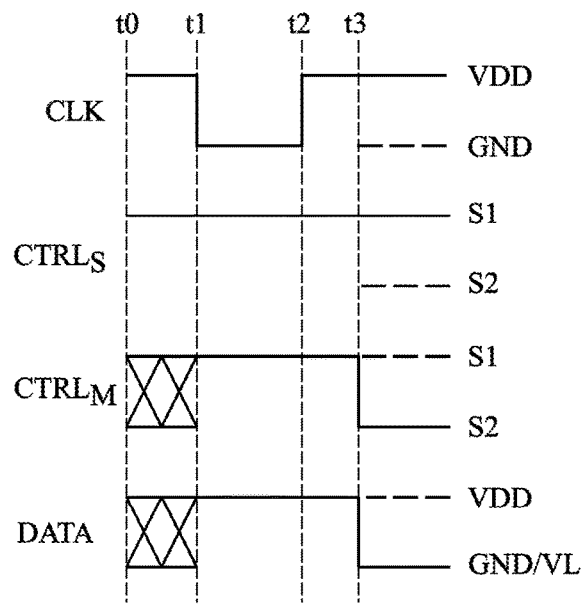
FIG. 2 shows timing diagrams illustrating an embodiment of waking up the slave circuit of the system of FIG. 1.

FIG. 2 shows timing diagrams illustrating a waking up of the slave circuit. These timing diagrams show the variations of signals CLK, $CTRL_S$, $CTRL_M$, and DATA. For simplification, the level switchings of signals DATA and CLK are considered as instantaneous. Further, signals $CTRL_S$ and $CTRL_M$ are schematically shown, each signal $CTRL_S$, $CTRL_M$ comprising a state S1 in which the corresponding switch 53, 51 is off, and a state S2 in which this switch is on.

Figure 5:
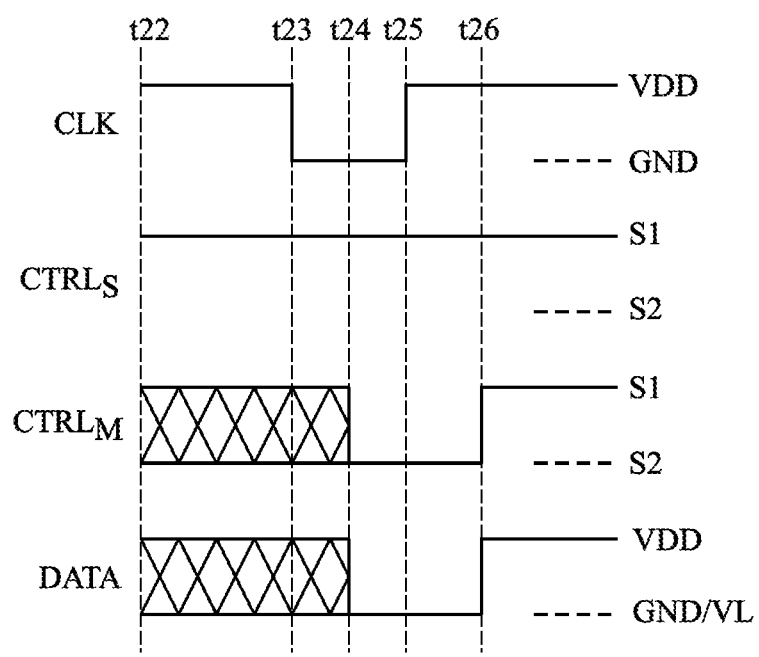
FIG. 5 shows timing diagrams illustrating an embodiment of setting to stand-by the slave circuit of the system of FIG. 1 after a transmission from the master circuit to the slave circuit.

An initial state where the slave circuit is at stand-by, for example, after the starting of the system of FIG. 1 or after setting to stand-by the slave circuit which will be described in relation with FIG. 5, is assumed. At the wake-up, the master circuit sets signal DATA so that it has a falling edge while signal CLK is at the high level.

The initial state where, by default, switch 51 of slave circuit 3 is off ($CTRL_S$ at state S1) and signal CLK is at a high level, substantially equal to potential VDD, is illustrated between times t0 and t1. The state of signal $CTRL_M$, and thus the level of signal DATA, is indifferent between times t0 and t1.

At time t1, the master circuit sets signal CLK to a low level, substantially equal to potential GND in this example. Further, if switch 53 of the master circuit is on ($CTRL_M$ at state S2), the master circuit sets signal DATA to the high level by turning off its switch 53 ($CTRL_M$ at state S1). At a time t3, subsequent to the next rising edge of signal CLK (time t2), the master circuit sets signal DATA to the low level ($CTRL_M$ at state S2). The slave circuit sees a falling edge of signal DATA while signal CLK is at the high level, and wakes up.

An advantage of the wake-up method such as described in relation with FIG. 2 is that the reading from the bus by the slave circuit is performed differentially, here at a falling edge of signal DATA, which enables the slave circuit not to share a common reference potential with the master circuit. Further, due to the fact that signals CLK and DATA are at opposite levels between times t1 and t2, circuit 21 is powered at the falling edge of signal DATA at time t3.

Figure 3:
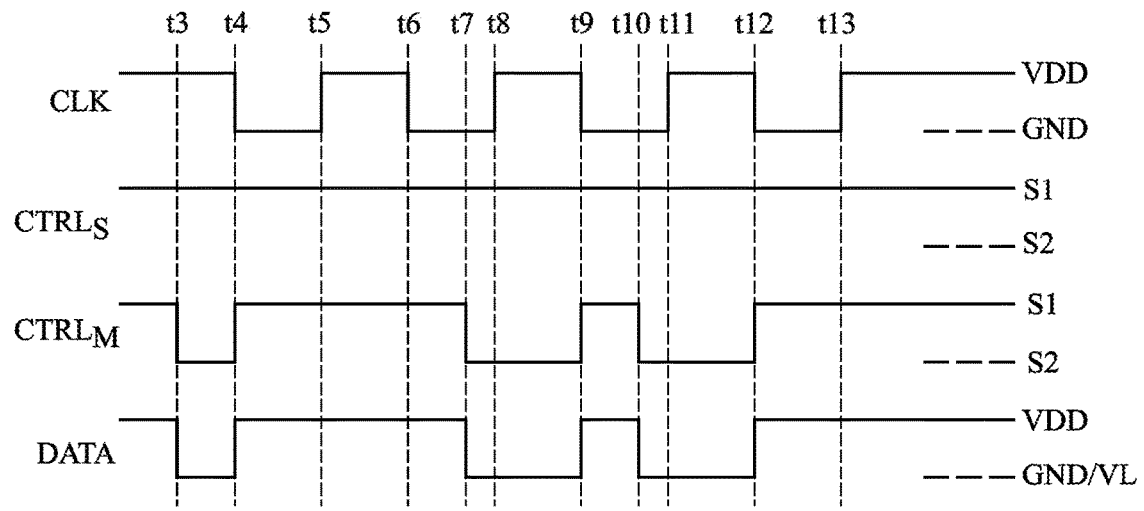
FIG. 3 shows timing diagrams illustrating an example transmission from the master circuit to the slave circuit of the system of FIG. 1.

FIG. 3 shows timing diagrams illustrating the transmission of a word, in this example a four-bit word '1', '0', '0', and '1', from the master circuit to the slave circuit. These timing diagrams show, in the same way as in FIG. 2, the variation of signals CLK, $CTRL_S$, $CTRL_M$, and DATA.

By default, switch 51 of the slave circuit is off ($CTRL_S$ at state S1). Thus, the level of signal DATA only depends on the state of switch 53 of the master circuit. To transmit a bit of a word from the master circuit to the slave circuit, the master circuit sets, between two times surrounding a rising edge of signal CLK, signal DATA to a level corresponding to the state of the bit to be transmitted. The slave circuit reads the bit at this rising edge of signal CLK.

In the shown example, the successive transmission of the four bits from the master circuit to the slave circuit occurs after the wake-up step (time t3) such as described in relation with FIG. 2. The four bits of the word are read by the slave circuit at times t5, t8, t11, and t13 corresponding to four successive rising edges of signal CLK, subsequent to time t3.

At a time t4, corresponding to a falling edge of signal CLK subsequent to time t3 and prior to time t5 (rising edge of signal CLK), the master circuit sets signal DATA to the high level ($CTRL_M$ at state S1) to transmit a bit at state '1'. At time t5, the slave circuit reads the first bit of signal DATA at state '1'. The master circuit leaves its switch in the same state, here off ($CTRL_M$ at state S1), at least until the next falling edge of signal CLK (time t6).

At a time t7, subsequent to time t6 and prior to time t8 (rising edge of signal CLK), the master circuit sets signal DATA to the low level ($CTRL_M$ at state S2) to transmit a bit at '0'. At time t8, the slave circuit reads the second bit of signal DATA at state '0'. The master circuit leaves its switch in the same state, here on ($CTRL_M$ at state S2), until the next falling edge of signal CLK (time t9).

At time t9, the master circuit sets signal DATA to the high level ($CTRL_M$ at state S1), opposite to the low level of signal CLK. At a time t10, subsequent to time t9 and prior to time t11 (rising edge of signal CLK), the master circuit sets signal DATA to the low level ($CTRL_M$ at state S2) to transmit a bit at state '0'. At time t11, the slave circuit reads the third bit of signal DATA at state '0'. The master circuit leaves its switch in the same state, here on ($CTRL_M$ at state S2), until the next falling edge of signal CLK (time t12).

At time t12, the master circuit sets signal DATA to the high level ($CTRL_M$ at state S1), to transmit a bit at state '1'. At time t13 (rising edge of signal CLK), the slave circuit reads the fourth bit of signal DATA at state '1'.

At the end of the transmission of the word from the master circuit to the slave circuit, signal CLK remains at the high level.

An advantage of the transmission method such as described in relation with FIG. 3 is that the reading from the bus by the slave circuit is performed differentially, here at a rising edge of signal CLK, which enables the slave circuit not to share a common reference potential with the master circuit. Further, signal DATA is at a level opposite to that of signal CLK between times t3 and t5, t6 and t7, t8 and t10, and t11 and t13, which enables circuit 21 of the slave circuit to be powered on reading of the bits on the rising edges of signal CLK.

In practice, in the method described in relation with FIG. 3, in order for signal DATA to be properly read, that is, stored by the slave circuit, the time between times t7 and t8, and t10 and t11, is greater than or equal to a time of stabilization of signal DATA. Such a stabilization time depends on the technology used and is generally short as compared with the time separating two successive falling edges of signal CLK. Thus, on transmission of a bit at state '0', signals CLK and DATA are at the same level for a short time only.

Figure 4:
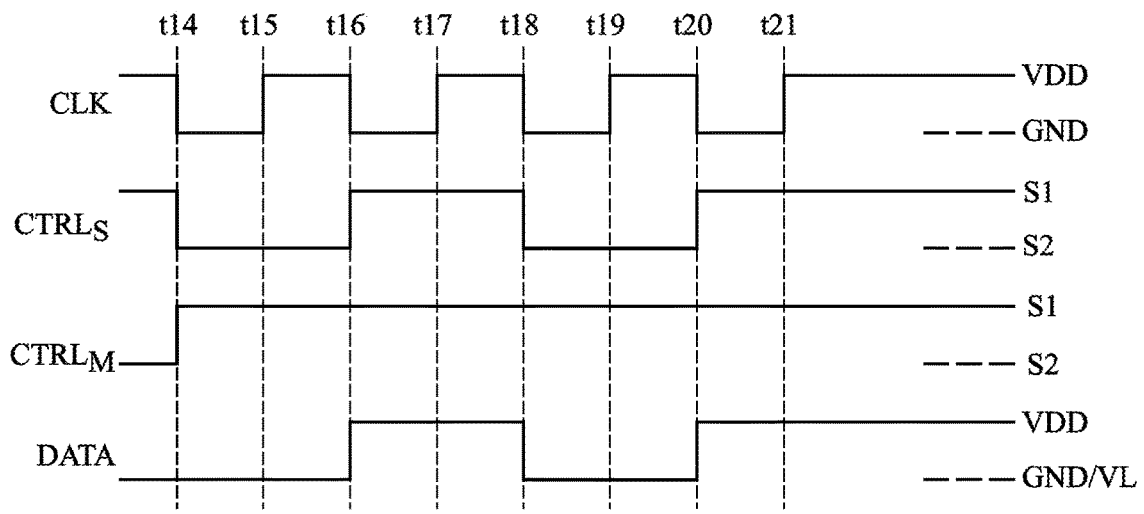
FIG. 4 shows timing diagrams illustrating an example transmission from the slave circuit to the master circuit of the system of FIG. 1.

FIG. 4 shows timing diagrams illustrating the transmission of a word, in this example a four-bit word '0', '1', '0', and '1', from the slave circuit to the master circuit. These timing diagrams show, in the same way as in FIGS. 2 and 3, the variation of signals CLK, $CTRL_S$, $CTRL_M$, and DATA.

To transmit a bit of a word from the slave circuit to the master circuit, the master circuit turns off its switch 53 ($CTRL_M$ at state S1) so that the level of signal DATA only depends on the state of switch 51 of the slave circuit. The slave circuit then sets, between two successive falling edges surrounding a rising edge of signal CLK, signal DATA to a level corresponding to the state of the bit to be transmitted. The master circuit reads the bit at this rising edge of signal CLK.

In the shown example, the four bits of the word are read by the master circuit at times t15, t17, t19, and t21 corresponding to four successive rising edges of signal CLK.

At a time t14, corresponding to the falling edge of signal CLK coming before time t15, the slave circuit sets signal DATA to the low level ($CTRL_S$ at state S2) to transmit a bit at state '0'. At time t15 (rising edge of signal CLK), the master circuit reads the first bit of signal DATA at state '0'.

At a time t16, corresponding to the falling edge of signal CLK following time t15 and coming before time t17, the slave circuit sets signal DATA to the high level ($CTRL_S$ at state S1) to transmit a bit at state '1'. At time t17 (rising edge of signal CLK), the master circuit reads the second bit of signal DATA at state '1'.

The transmission of the third bit at state '0' between times t18 and t20, corresponding to two successive falling edges of signal CLK surrounding time t19 (rising edge of signal CLK), is performed in the same way as the transmission of the first bit between times t14 and t16.

At time t20, prior to the rising edge of signal CLK of time t21, the slave circuit sets signal DATA to the high level ($CTRL_S$ at state S1), to transmit a bit at state '1'. At time t21 (rising edge of signal CLK), the master circuit reads the fourth bit of signal DATA at state '1'.

At the end of the transmission of the word from the slave circuit to the master circuit, signal CLK remains at the high level. Due to the fact that the slave circuit sees no falling edge on signal CLK, signal DATA remains at the level corresponding to the state of the last bit read by the master circuit, in this example, the high level.

An advantage of the transmission method described in relation with FIG. 4 is that, here again, the reading of the bus by the master circuit is performed differentially. Another advantage is that the state switchings of the switch of the slave circuit are triggered by the level transitions of signal CLK, which enables the synchronization signal to be provided by the master circuit.

FIG. 5 shows timing diagrams illustrating an embodiment of setting to stand-by the slave circuit after the transmission of a word from the master circuit to the slave circuit. These timing diagrams show, in the same way as in FIGS. 2, 3, and 4, the variation of signals CLK, $CTRL_S$, $CTRL_M$, and DATA.

At setting to stand-by, the master circuit sets signal DATA so that it has a rising edge while signal CLK is at the high level. Here again, the bus reading is performed differentially. Once the slave circuit is at stand-by, the slave circuit may be woken back up in accordance with the method described in relation with FIG. 2.

After the transmission of a word from the master circuit to the slave circuit (time t22), as described in relation with FIG. 3, signal CLK is at the high level, the switch of the slave circuit is turned off ($CTRL_S$ at state S1), and signal DATA is at the level corresponding to the state of the last transmitted bit.

At a time t23, subsequent to time t22, the master circuit sets signal CLK to a low level. At a time t24, subsequent to time t23, if signal DATA is at the high level, the master circuit sets signal DATA to the low level ($CTRL_M$ at state S2). At a time t25, subsequent to time t24, the master circuit sets signal CLK to the high level. At a time t26, subsequent to time t25, the master circuit sets signal DATA to the high level (CTRL$_M$ at state S1). The slave circuit sees a rising edge of signal DATA while signal CLK is at the high level, and sets to stand-by.

Once the slave circuit is at stand-by and while signal CLK is at the low level, the master circuit may modify the level of signal DATA to charge capacitance 23 of slave circuit 3.

In embodiments of the communication method previously described in relation with FIGS. 1 to 5, a bit at state '1' or '0' is transmitted by setting signal DATA to the corresponding level while signal CLK is at the low level, and the slave circuit is set to stand-by or woken up by a transition of signal DATA while signal CLK is at the high level.

In the previous description, unless otherwise indicated, term "substantially" means to within 10% of potential VDD, for example to within 5% of potential VDD.

In an example of application, capacitance 23 has a value of 10 nF and potential VDD is equal to 2.5 V. The time of transmission of a byte may then be in the range from 20 to 30 µs, for example, approximately 26 µs. Further, in this example of application, between the transmission of a byte and the transmission of the next byte, the master circuit may maintain signal CLK at a high level and signal DATA at a low level for from 5 to 15 µs, for example approximately 10 µs, to charge the capacitance. An average transmission rate in the range from 250 to 300 kbits·s$^{-1}$, for example, approximately, 270 kbits·s$^{-1}$, can then be observed.

Specific embodiments have been described. Various alterations, modifications, and improvements will occur to those skilled in the art. In particular, although a comparison method where the reading of a bit is performed on a rising edge of signal CLK has been described, this method also applies in the case where the reading of a bit is performed on a falling edge of signal CLK. In this case, a bit at state '1' or '0' is transmitted by setting signal DATA to the corresponding level while signal CLK is at the high level, and the slave circuit is set to stand-by or woken up by a transition of signal DATA while signal CLK is at the low level. Similarly, the steps of waking up and setting to stand-by have been described with respective falling and rising edges of signal DATA. This method also applies in the case where the steps of waking up and of setting to stand-by are carried out with respective rising and falling edges of signal DATA.

It has been previously indicated that a bit is at state '1' when signal DATA is at a high level, and at state '0' when signal DATA is at a low level. This coding may be inverted. Further, although transmissions of words of four or eight bits have been described, the communication method applies to the transmission of a single bit or of words comprising any number of bits.

Although a system comprising a single slave circuit has been shown in FIG. 1, it will be within the abilities of those skilled in the art to apply embodiments of the previously-described communication method to a system comprising a plurality of slave circuits, for example, by combining the communication method with known slave circuit addressing protocols. Further, although a system where the bus conductor conveying data signal DATA is at a high level in the quiescent state has been described, the communication method also applies to the case where the conductor is at a low level in the quiescent state. Further, the methods of transmission, waking up, and setting to stand-by also apply in the case where the voltage rectifying bridge is of halfwave type, and in the case where slave circuit 3 comprises a power supply source of battery type or other type rather than a rectifying bridge associated with a capacitance. Finally, certain steps of the communication method also apply in the case of a unidirectional bus.

Such alterations, modifications, and improvements are intended to be part of this disclosure, and are intended to be within the spirit and the scope of the present disclosure. Accordingly, the foregoing description is by way of example only and is not intended to be limiting.

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, standard integrated circuits, state machines, look-up tables, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method, comprising:
  coupling a first circuit and a second circuit of a system together over a two-line bus having a clock line and a data line;
  selectively providing a power signal to the second circuit over the two-line bus by setting the clock line and the data line to different potential levels; and
  transmitting a bit from one of the first circuit and the second circuit to the other of the first circuit and the second circuit, the transmitting including:
    setting, by the one of the first and second circuits, the data line to a potential level according to a state of the bit to be transmitted when the clock line is set at a first potential level; and
    reading, by the other of the first and second circuits, the data line in response to a transition of the clock line from the first potential level to a second potential level, different from the first potential level, wherein:

the first circuit is powered with a voltage referenced to the first potential and comprises a first switch to couple the first potential to the data line of the bus;

the second circuit has a high potential node and to a low potential node, and comprises a second switch to couple the data line to the low potential node; and the system comprises a resistive element coupled between said data line and the second potential level.

2. The method of claim 1 wherein the first circuit is a master circuit and the second circuit is a slave circuit.

3. The method of claim 1, comprising:

waking up the second circuit, the waking up including the first circuit causing a transition of a first type of the data line when the clock line is at the second potential level.

4. The method of claim 3, comprising:

setting the second circuit to a stand-by mode, the setting the second circuit to the stand-by mode including the first circuit causing a transition of a second type of the data line when the clock line is at the second potential level.

5. The method of claim 4 wherein the transition of the first type is a falling edge transition and the transition of the second type is a rising edge transition.

6. The method of claim 1 wherein the selectively providing a power signal comprises, during a transmission of a bit from the first circuit to the second circuit, when the clock line is at the first potential level, and before setting the data line according to the state of the bit to be transmitted, the first circuit sets the data line to a potential level different from the second potential level.

7. A system, comprising:

a first circuit;

a second circuit; and a two-line bus coupling the first circuit to the second circuit, the two-line bus including a clock line and a data line, wherein in operation, the first circuit selectively provides a power signal to the second circuit over the two-line bus by setting the clock line and the data line to different potential levels;

one of the first circuit and the second circuit selectively transmits a bit to the other of the first circuit and the second circuit by setting the data line to a potential level according to a state of the bit to be transmitted when the clock line is set at a first potential level; and the other of the first and second circuits, in response to a transition of the clock line from the first potential level to a second potential level, different from the first potential level, reads the data line, wherein:

the first circuit is powered with a voltage referenced to the first potential and comprises a first switch to couple the first potential to the data line of the bus;

the second circuit has a high potential node and to a low potential node, and comprises a second switch to couple the data line to the low potential node; and the system comprises a resistive element coupled between said data line and the second potential level.

8. The system of claim 7 wherein the first circuit is a master circuit and the second circuit is a slave circuit.

9. The system of claim 8 wherein, in operation, the master circuit selectively wakes up the slave circuit by causing a transition of a first type of the data line when the clock line is at the second potential level.

10. The system of claim 9 wherein, in operation, the master circuit selectively sets the slave circuit to a stand-by mode by causing a transition of a second type of the data line when the clock line is at the second potential level.

11. The system of claim 10 wherein the transition of the first type is a falling edge transition and the transition of the second type is a rising edge transition.

12. The system of claim 8 wherein the two-line bus is a first two-line bus, the system comprising:

a second slave circuit; and a second two-line bus having a clock line and a data line and coupling the master circuit to the second slave circuit.

13. The system of claim 12 wherein the first two-line bus and the second two-line bus share at least one of a common clock line and a common data line.

14. The system of claim 7 wherein the selectively providing a power signal comprises, during a transmission of a bit from the first circuit to the second circuit, when the clock line is at the first potential level, and before setting the data line according to the state of the bit to be transmitted, the first circuit sets the data line to a potential level different from the second potential level.

15. The system of claim 7 wherein the second circuit comprises a rectification circuit coupled between the two-line bus and the high and low potential nodes, and the rectification circuit, in operation, extracts power from the two-line bus.

16. A master circuit, comprising:

a first potential node;

a second potential node;

a first bus node, which, in operation, outputs a clock signal to a clock line of a two-line bus;

a second bus node, which, in operation, couples to a data line of the two-line bus; and control circuitry, which, in operation:

selectively provides a power signal to the first bus node and the second bus node by setting the clock signal and a data signal to different potential levels;

transmits a bit by setting the data signal to a potential level according to a state of the bit to be transmitted when the clock signal is set at a first potential level; and reads a bit by reading the second bus node in response to a transition of the clock signal from the first potential level to a second potential level, different from the first potential level, wherein the master circuit includes:

a resistive element coupled between the first potential node and the second bus node; and a switch coupled between the second bus node and the second potential node, wherein in operation, the control circuitry generates the data signal by controlling the switch.

17. The master circuit of claim 16 wherein the control circuitry, in operation, selectively transmits a wake-up signal to a slave circuit by causing a transition of a first type of the data signal when the clock signal is at the second potential level.

18. The master circuit of claim 17 wherein the control circuitry, in operation, selectively transmits a stand-by signal to the slave circuit by causing a transition of a second type of the data signal when the clock signal is at the second potential level.

19. The master circuit of claim 16 wherein the selectively providing a power signal comprises, during a transmission of a bit when the clock signal is at the first potential level, and before setting the data signal according to the state of the bit to be transmitted, setting the data signal to a potential level different from the second potential level.

20. A slave circuit, comprising:
- a first bus node, which, in operation, couples to a clock line of a two-line bus;
- a second bus node, which, in operation, couples to a data line of the two-line bus; and
- control circuitry, which, in operation:
  - extracts a power signal from the first bus node and the second bus node when a received clock signal at the first bus node and a received data signal at the second bus node are at different potential levels;
  - transmits a bit by setting the data signal at the second bus node to a potential level according to a state of the bit to be transmitted when the received clock signal is set at a first potential level; and
  - reads a bit by reading the second bus node in response to a transition of the received clock signal from the first potential level to a second potential level, different from the first potential level, wherein the slave circuit includes:
    - rectification circuitry coupled to the first bus node and the second bus node, wherein the rectification circuitry, in operation, extracts the power signal and provides the power signal to a high-potential node and a low-potential node;
    - a capacitance coupled between the high-potential node and the low-potential node; and
    - a switch coupled between the second bus node and the low-potential node.

21. The slave circuit of claim 20 wherein the control circuitry, in operation, causes the slave circuit to enter a wake-up mode in response to a transition of a first type of a received data signal when the clock signal is at the second potential level.

22. The slave circuit of claim 20 wherein the control circuitry, in operation, causes the slave circuit to enter a stand-by mode in responds to a transition of a second type of the received data signal when the clock signal is at the second potential level.

* * * * *